No. 842,496. PATENTED JAN. 29, 1907.
J. ROYLE, Jr.
PIANO MACHINE HEAD FOR PUNCHING JACQUARD CARDS.
APPLICATION FILED APR. 14, 1904.

No. 842,496. PATENTED JAN. 29, 1907.
J. ROYLE, Jr.
PIANO MACHINE HEAD FOR PUNCHING JACQUARD CARDS.
APPLICATION FILED APR. 14, 1904.

No. 842,496. PATENTED JAN. 29, 1907.
J. ROYLE, Jr.
PIANO MACHINE HEAD FOR PUNCHING JACQUARD CARDS.
APPLICATION FILED APR. 14, 1904.

Witnesses:
Inventor:

No. 842,496.

PATENTED JAN. 29, 1907.

J. ROYLE, Jr.
PIANO MACHINE HEAD FOR PUNCHING JACQUARD CARDS.
APPLICATION FILED APR. 14, 1904.

No. 842,496. PATENTED JAN. 29, 1907.
J. ROYLE, Jr.
PIANO MACHINE HEAD FOR PUNCHING JACQUARD CARDS.
APPLICATION FILED APR. 14, 1904.

Witnesses:

Inventor:

UNITED STATES PATENT OFFICE.

JOHN ROYLE, JR., OF PATERSON, NEW JERSEY.

PIANO-MACHINE HEAD FOR PUNCHING JACQUARD-CARDS.

No. 842,496.                  Specification of Letters Patent.                  Patented Jan. 29, 1907.

Application filed April 14, 1904. Serial No. 203,220.

*To all whom it may concern:*

Be it known that I, JOHN ROYLE, Jr., a citizen of the United States, and a resident of Paterson, in the county of Passaic and State of New Jersey, have invented a new and useful Improvement in Piano-Machine Heads for Punching Jacquard-Cards, of which the following is a specification.

My invention relates to an improvement in piano-machine heads for punching jacquard-cards, with the object in view of providing means for operating a group of punches greater than the number of keys in such varying combinations as to render the machine universal in its character with respect to patterns which are to be reproduced and at the same time provide for accomplishing the various changes in the combinations of punches in an expeditious and efficient manner.

A practical embodiment of my invention is represented in the accompanying drawings, in which—

The head consists of a base-plate 1, resting on a pair of vertical bars 2 and 3, which may be operated in any well-known or approved manner to raise and lower the bank of punches 4 on the base-plate 1.

On the base-plate 1 a plate 5 is fixed, which forms the support for the punch locking and releasing slides and their operating-levers to be hereinafter more particularly referred to, and said plate 5 is removably connected with the base-plate 1, so that it together with the parts carried thereby may be removed together whenever desired.

The plate 5 and the parts carried thereby are surrounded by a casing 6, removably secured to the base-plate 1, and the said casing is in turn provided with a removable cap 7, which when in position completely houses the plate 5 and the working parts carried thereby, protecting them from dust and foreign matter which might interfere with the operation.

The casing 6 is conveniently secured to the plate 1 by means of the upwardly-projecting tenons 8 and 9 from the bars 2 and 3, respectively, which tenons enter sockets in the opposite ends of the casing 6, and the casing is locked to the tenons by means of screws 10, having their heads countersunk in the casing 6 and engaging screw-threaded sockets in the upper ends of the tenons 8 and 9.

On the plate 5, at or near its rear edge, there is located a longitudinally-sliding base-plate 11, on which the levers 12 12*, &c., (shown in Fig. 13,) in the present instance eight in number, are assembled. The plate 5 is cut away or recessed at its rear to accommodate the said base-plate 11 and levers 12 12*, &c., thereon. These levers 12 12*, &c., consist of thin plates each having at one end an eye 13 for pivoting it on a stud 14, fixed to and uprising from one end of the sliding base-plate 11, and at the opposite end each of said levers is provided with an elongated slot 15 for permitting it to move forward and backward a limited distance on a stud 16, fixed to and uprising from the opposite end of the sliding base-plate 11. The levers 12 12*, &c., serve to transmit motion from the keys to the punch-locking slides.

Figure 3:
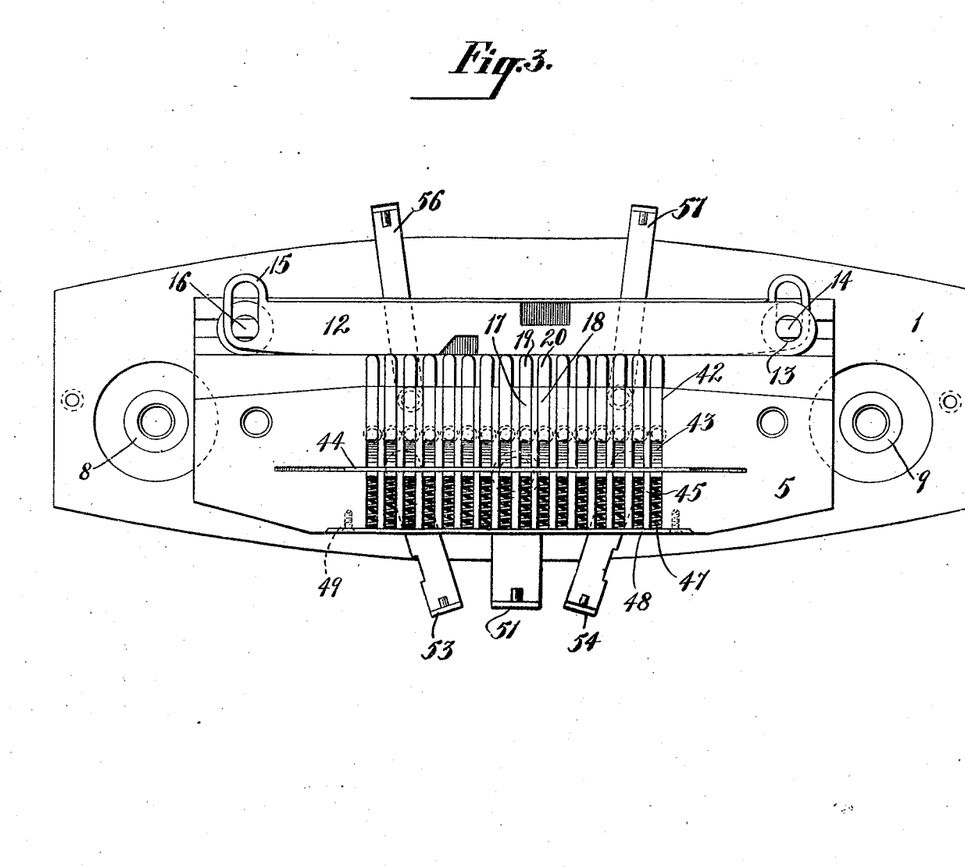
Fig. 3 is a top plan view of the slides and bank of levers, the cover and side walls of the casing being removed together with the operating-keys.
Figure 6:
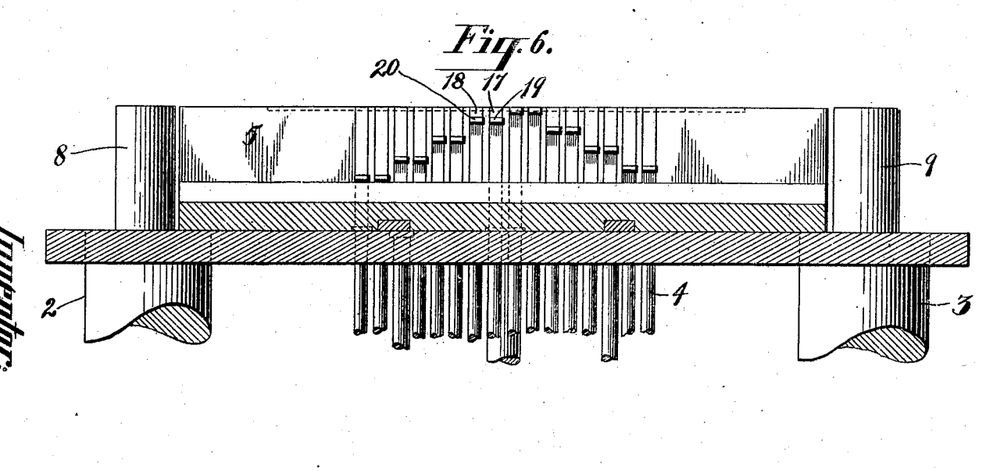
Fig. 6 is a longitudinal vertical section in the plane of the line B B of Fig. 1 looking toward the front.
Figures 7, 8, 9, 10, 11, 12:
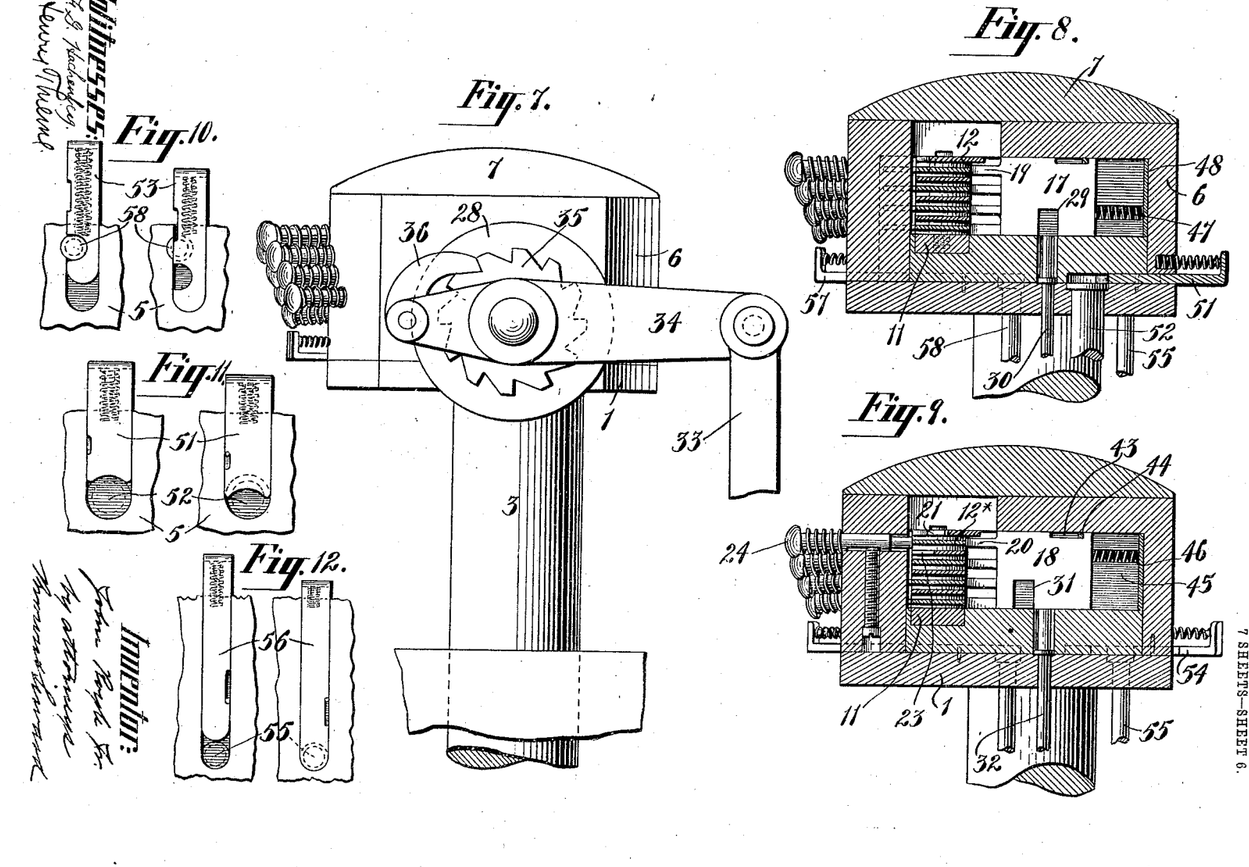
Fig. 7 is a view in end elevation.
Fig. 8 is a vertical section from front to rear in the plane of the line C C of Fig. 1 looking toward the right as the sheet is held.
Fig. 9 is a similar section in the plane of the line D D of Fig. 1 looking toward the right.
Fig. 10 represents a plan view of one of the lacing-punch slides in its two positions for releasing and locking the punch.
Fig. 11 represents the peg-hole punch-locking slide in each of its locking positions to release and lock the punch.
Fig. 12 is an auxiliary lacing-hole punch-locking slide in each of two positions to release and lock the punch.

The punch-locking slides are shown in top plan in Fig. 3, in rear elevation in Fig. 6, and in side elevation in Figs. 8 and 9. They are arranged, as shown in the accompanying drawings, in pairs, one pair being shown in Figs. 8 and 9, the member of the pair shown in Fig. 8 being denoted by 17 and the member of the pair shown in Fig. 9 being denoted by 18.

The members of a pair 17 18 have their tailpieces 19 20 in the same horizontal plane to be operated by one of the several levers 12 12*, &c., the tailpieces of the pair 17 18 being in position to be operated by the second lever from the top of the series indicated by 12*.

Figure 1:
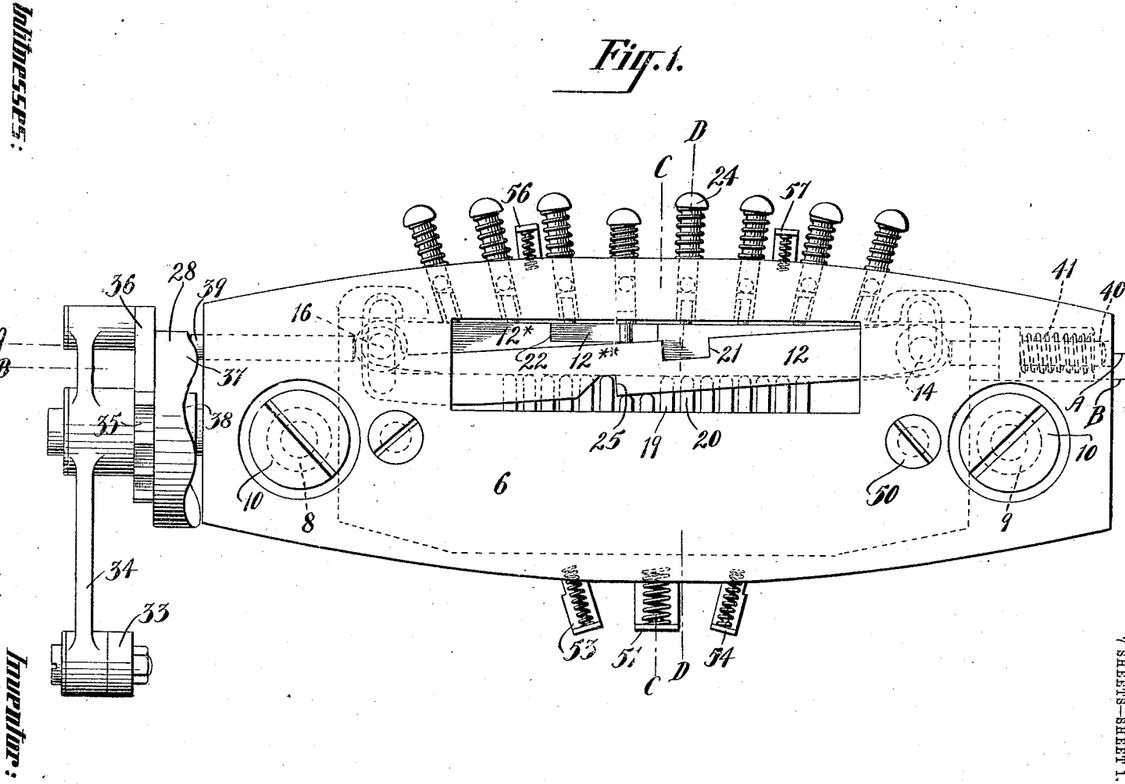
Figure 1 is a top plan view of the head, showing one of the slide-operating levers pushed forward and the bank of levers in their normal position.
Figure 2:
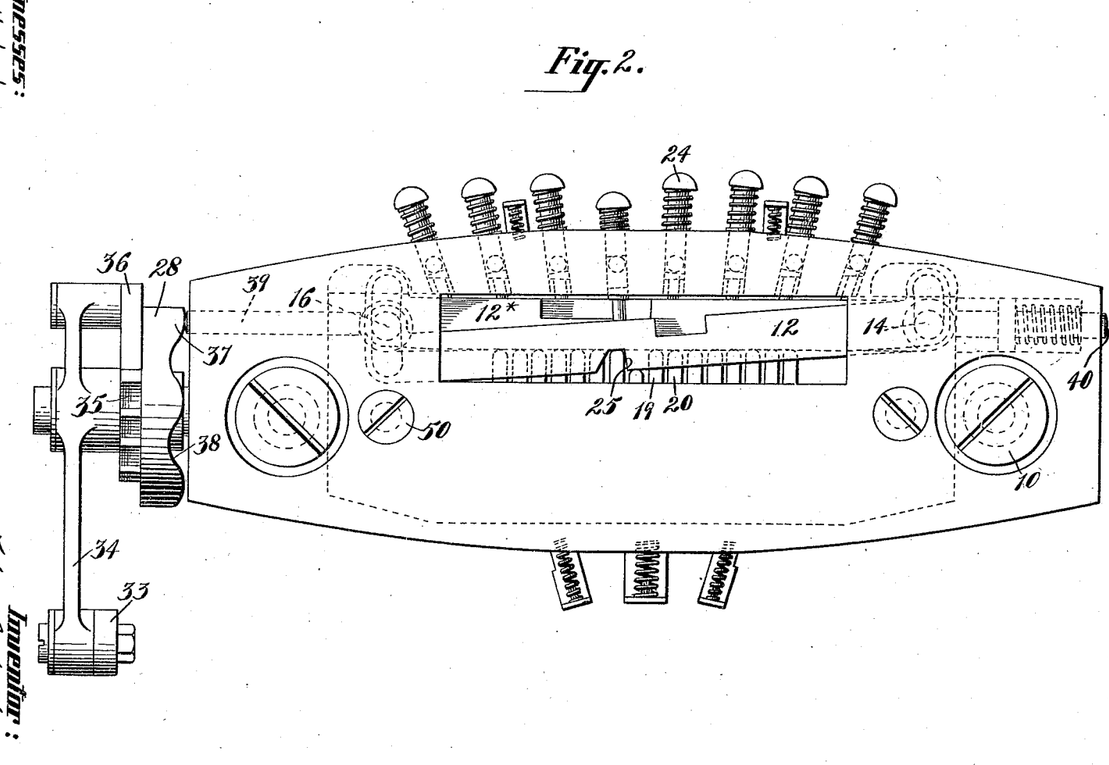
Fig. 2 is a similar view showing the bank of levers moved laterally and one of the levers pressed forward.
Figure 13:
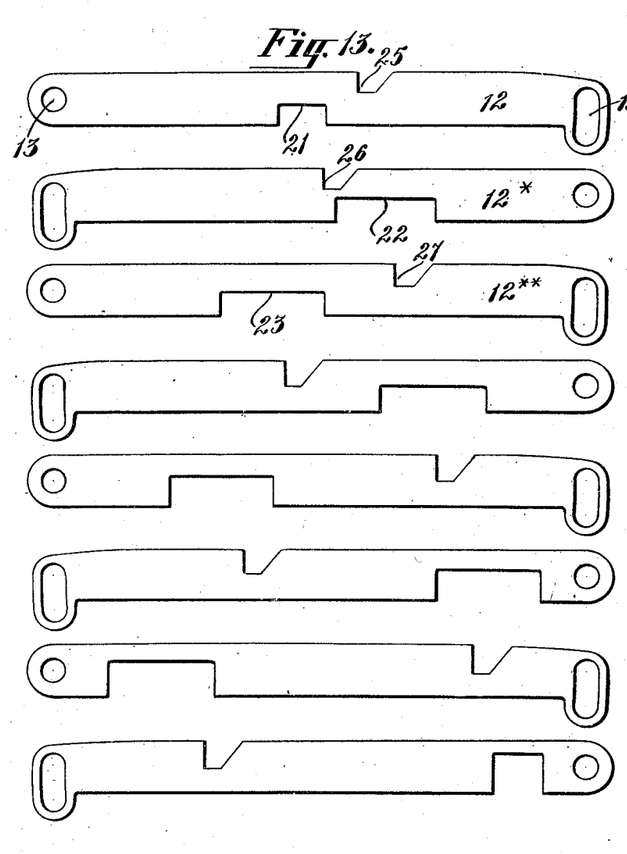
Fig. 13 represents the series of slide-operating levers which compose the bank.
Figure 14:
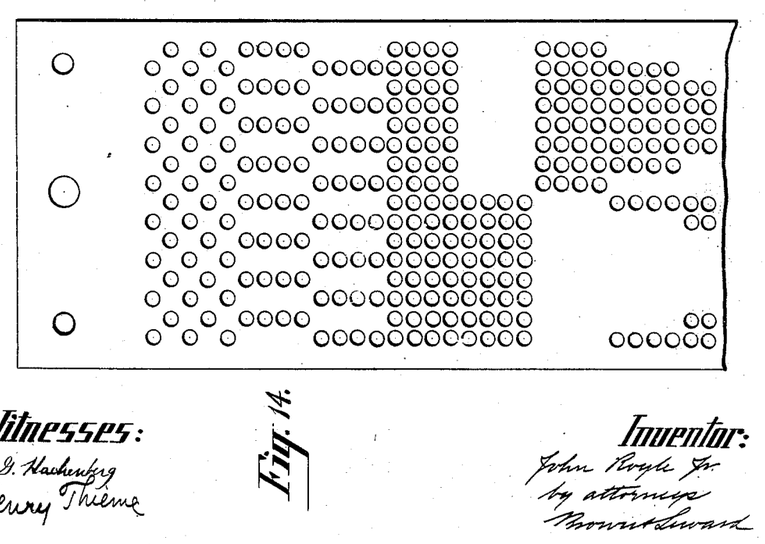
Fig. 14 represents a portion of one of the cards, showing some of the various combinations of punch-holes which may be produced by the machine.

It will be observed in reading the drawings that the series of levers, Fig. 13, are reversed both longitudinally and laterally from the position which they occupy in Fig. 1.

The levers 12 12*, &c., are cut away, as shown at 21 22 23, &c., to prevent the key which is intended to operate one of the levers from coming in contact with the lever or levers located in proximity to the lever which is to be operated by that particular key. For example, the key which operates the lever 12* is denoted by 24, and the levers 12 and 12**, located the one above and the other below the lever 12*, are provided with the cut-away portions 21 and 23 in such alinement with respect to the lever 12* that there will be no chance of the key pressing against the lever 12* for engaging either the lever 12 or 12**. This point is also made clear in Fig. 9. The levers 12 12*, &c., are further provided with notches 25 26 27, &c., which notches are so located that when the levers are in their normal positions they will when swung by the pressure of the key engage the tailpieces of the two members of a pair of locking-slides, (see, for example, the position of the lever 12* with respect to the tailpieces 19 20 of the pair of locking-slides 17 18;) but when the entire bank of levers is moved endwise by the action of the cam 28 the positions of the notches 25 26 27, &c., are so related to the positions of the tailpieces of the respective pairs of locking-slides that one of said tailpieces of each pair will come opposite one of the notches 25 26 27, &c., so that one member of each pair of locking-slides will be operated by the swinging of all of the levers, while the other members of the pair of locking-slides will remain at rest. In this connection attention is called to the structure of the locking-slides 17 18, which compose a pair. It will be observed that these slides 17 18 (shown in Figs. 8 and 9) are in their normal position and that one member of the pair (in the present instance 17) is provided with a slot 29 in its under face, which lies normally directly over the punch 30, which it is intended to lock or release, while the slide 18 (the other member of the pair) has its slot 31 in its under face so located that the slide 18 will lock the punch 32, which it is intended to lock or release. If, however, the key 24 be pressed to swing the lever 12* while the bank of levers remains in normal position, it will move both the locking-slides 17 and 18 forward, locking the punch 30 and releasing the punch 32. Again, if the bank of levers be shifted bodily endwise, so that the operation of the lever 12* will only operate one of the locking-slides 17 18, then either the slide 18 will be moved forwardly to release the punch 32, while the punch 30 remains released, as shown in Fig. 8, or the slide 17 will be moved to the rearward to lock the punch 30, while the punch 32 remains in its locked position, thus either locking or releasing both of the punches controlled by this pair of locking-slides, as may be desired.

In the same manner each of the other seven pairs of locking-slides may be manipulated by each of the other seven keys, either simultaneously or in such combinations as to produce the desired pattern effect. It is also obvious that these slides here shown might be shifted, making the members of each pair change places to produce new effects, or in other respects changed about to produce various combinations.

The operating-keys, one of which, 24, was hereinabove particularly referred to, may be mounted in any well-known or approved manner.

The operation of the cam 28 is conveniently accomplished by foot-power (not shown) through a connecting-rod 33, attached to one end of the lever 34, fulcrumed concentric with a ratchet-toothed wheel 35 and carrying an actuating-pawl 36, the ratchet-wheel 35 being connected to rotate with the cam 28 and the latter being provided throughout its face with alternating projections 37 and depressions 38 for operating a sliding pin 39, mounted in the head and engaged with the end of the sliding base 11, on which the bank of levers 12 12*, &c., is mounted.

The return of the bank of levers is effected by a pin 40 at the opposite end of the head, which bears against the opposite end of the base-plate 11 and is actuated by a spring 41, tending to slide the bank of levers into their normal position whenever permitted to do so by the pin 39 and cam 28.

The several levers 12 12*, &c., may be interchanged, and they, as well as the slides, may be replaced by other sets to change the combinations for different patterns.

The plate 5 is milled at frequent intervals to form narrow vertical guideways 42, within which the sliding stops 17 18, &c., reciprocate, and the tops of the sliding stops are provided with shallow recesses 43, along which there extends a rod or small bar 44, which crosses the several partitions 45 between the guideways 42 and is intended to rest flush with the top of the partitions 45.

The several partitions 45 are further provided with horizontal slots 46, the walls of which serve to support in operative position slide-retracting springs 47. The springs 47 are intended to be a little greater in diameter than the width of the guideway 42, so that the slots 46, which are intended to be a little less in height than the diameter of the spring, (see Fig. 9,) serve to receive a slight part of the spring, enough to keep it from dropping or jumping out of position when once inserted in its place and the slides adjusted.

The casing 6 overlaps that part of the plate 5 which contains the slides and when locked in position holds the slides against upward displacement, as well as holding the bar or rod 44 in its position.

The retracting-springs 47 are inserted in position from the front of the plate 5 by removing the thin plate 48, and the latter when fastened in position—as, for example, by means of screws 49—serves to lock the springs in position and also serves as an abutment against which the springs press when the slides are forced forward by the operating-levers under the control of the keys.

The plate 5, with the parts carried thereby, may be bodily removed from and adjusted on the base-plate 1, the punches 30 32, &c., which project up through the plate 5, serving to locate it in its position on the plate 1 until the casing 6 has been placed in position.

Screws 50 may be utilized to lock the casing to the plate 5 in the event it is desired to remove the casing with the plate 5 in its relation thereto.

For purposes of punching the peg-holes in the card and lacing-holes I provide the central slide 51 for locking and releasing the peg-hole punch 52 and the slides 53 54 for locking the lace-holes punches 55 at the front of the head or in advance of the line of pattern-punches and the slides 56 57 for locking and releasing the lace-hole punches 58 at the rear of the line of pattern-punches.

Figure 4:
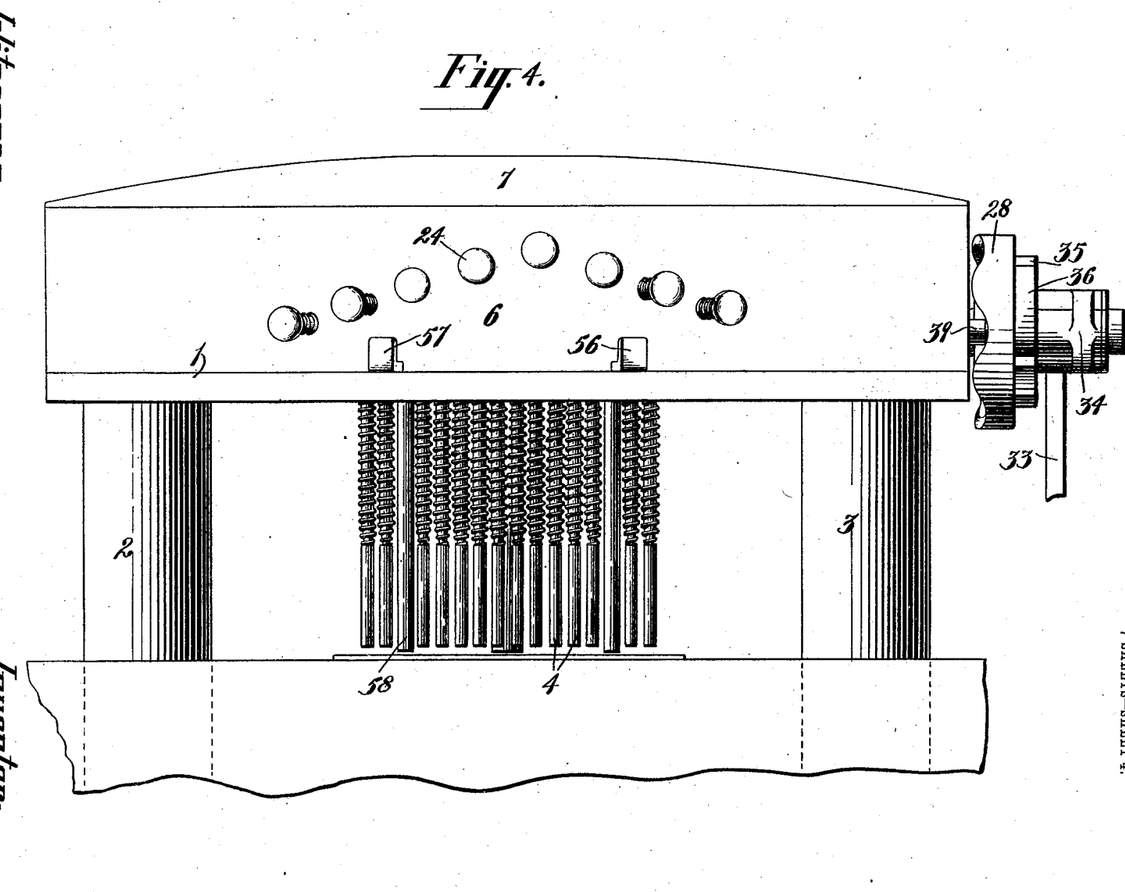
Fig. 4 is a view in rear elevation.
Figure 5:
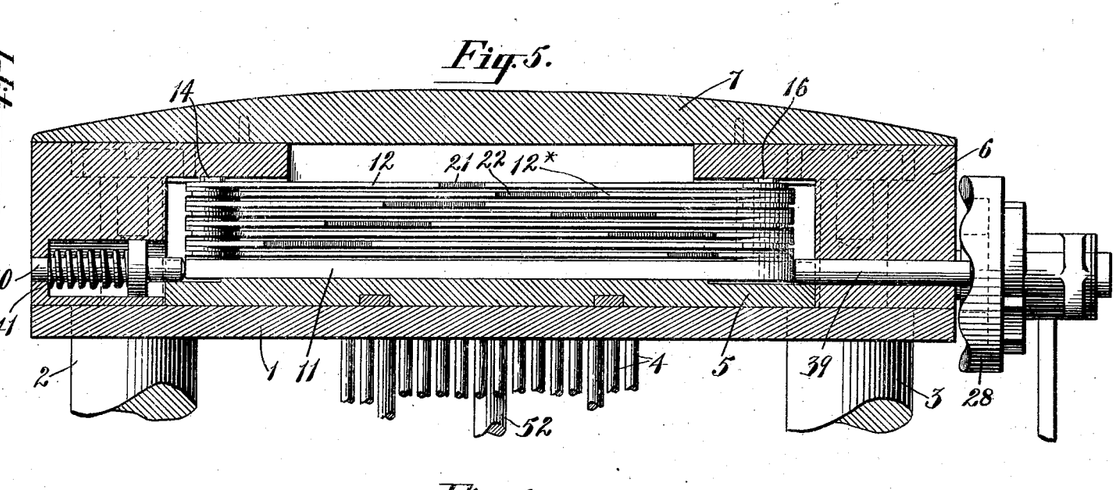
Fig. 5 is a longitudinal vertical section in the plane of the line A A of Fig. 1 looking from the rear toward the front.

The arrangement of the peg-hole and lace-hole punches is such that the card may be provided with its lace-hole punches as it enters the machine before it reaches the line of pattern-punches, and it may be given its lace-hole punches at the opposite end after it leaves the line of pattern-punches, or either set may be operated at the front and rear at either end of the card to provide it with its lace-hole punches, whether the card be at the same time underneath the pattern-punches or not, because of the peg-hole and lace-hole punches being extended the thickness of a pattern-card below the lower ends of the pattern-punches, as clearly indicated in Fig. 4, when the parts are in their normal position. Thus whether a part or all of the pattern-punches be locked or released the card will not be subjected to punching action therefrom, while it will be subjected to punching action of all such of the peg-hole and lace-hole punches as are stopped by the control-ling-slides, provided only that the head be lowered just the thickness of a pattern-card or thereabout and stopped before the pattern-punches have begun to cut it.

What I claim is—

1. The combination with the punches and means for operating them, of punch-controlling slides and means for operating the slides, the said slides being provided on their edges toward the punches with recesses located normally at different distances from the line of punches.

2. The combination with the punches and means for operating them, of sliding plates for locking and releasing the punches, a channeled plate for guiding the said sliding plates, an abutment, springs interposed between the sliding plate and abutment for returning the sliding plates to their normal positions and means for operating the said sliding plates against the tension of their retracting-springs, 3. The combination with the punches and means for operating them, of slides for locking and releasing the punches and horizontally-swinging levers superposed in a bank for engaging the slides and keys for operating the levers, said levers being each provided with an eye at one end and at ransversely-elongated slot at the other end for interchanging the levers at pleasure.

4. The combination with the punches and means for operating them, of slides for locking and releasing the punches, the said slides being provided with tailpieces at different elevations, a bank of levers for engaging the said tailpieces and keys for operating the levers.

5. The combination with the punches and means for operating them, of punch-controlling slides provided with tailpieces at different elevations, a bank of horizontally-swinging levers for engaging the tailpieces and keys for operating the levers, the levers above and below a given key being recessed on their edges toward the key to prevent unintentional operation of the levers.

6. The combination with the punches and means for operating them, of punch-controlling slides, a bank of levers for operating the slides, keys for operating the levers, and means for shifting the bank of levers longitudinally.

7. The combination with the punches and means for operating them, of punch-controlling slides, a bank of levers for engaging the slides, the said levers being provided with recesses on their edges toward the slides, keys for operating the levers and means for shifting the bank of levers bodily to change the relation of the recesses with respect to the slides.

8. The combination with the punches and means for operating them, of punch-controlling slides, a bank of levers for operating the slides, a longitudinally-sliding plate forming a support for the bank of levers, a rotary cam for operating the bank of levers as a whole and keys for operating the levers independently 9. The combination with the punches and means for operating them, of punch-controlling slides, a bank of levers for operating the slides, a longitudinally-sliding plate forming a support for the bank of levers, a cam for operating the bank of levers bodily in one direction, a spring for operating the bank of levers bodily in the opposite direction and keys for rocking the levers independently.

10. The combination with the punches and means for operating them, of interchangeable punch-controlling slides of different operative constructions and means for operating them.

11. The combination with the punches and means for operating them, of punch-controlling slides of different operative constructions, interchangeable levers for operating the differently-constructed slides and keys for operating the levers.

12. The combination with the punches and means for operating them, of interchangeable punch-controlling slides of different operative constructions, a bank of interchangeable levers engaging the differently-constructed slides and keys for controlling the levers.

13. The combination with the punches and means for operating them, of punch-controlling slides, a plate provided with a series of slots for receiving the slides, means for operating the slides and means for removably securing the plate and slides in operative relation with respect to the punches.

14. The combination with the punches, the base-plate forming a support for the punches and means for operating the punches, of reciprocating slides for locking and releasing the punches, a plate provided with a series of slots for the reception of the several slides and means for removably securing the said plate to the base-plate.

15. The combination with the base-plate, the punches supported therein and means for operating the punches, of reciprocating slides for locking and releasing the punches, a plate provided with slots in its upper face for the reception of the slides from above, means for locking the slides, a bar extending transversely across the slots for limiting the movement of the slides, means for operating the slides and means for securing the slotted plate to the base-plate.

16. The combination with the punches, the base-plate for supporting them and means for operating them, of reciprocating slides for locking and releasing the punches, a bank of levers for operating the slides, a base-plate for supporting the bank of levers, a slotted and recessed plate for receiving the slides in the slots and the lever-supporting plate in the recess, means for removably securing the slotted and recessed plate to the base-plate and means for operating the levers.

17. The combination with the punches, the base-plate forming a support therefor, the slides for locking and releasing the punches and the levers for operating the slides, of a plate forming a support for the slides and levers, keys for operating the levers, a casing forming a support for the keys, the said casing being arranged to embrace the said slide and lever-supporting plate and means for removably securing a casing to the base-plate.

18. The combination with the pattern-punches and means for operating them, of a peg-hole punch and means for operating it, the said peg-hole punch being longer than the pattern-punches, and means for locking and releasing the pattern and peg-hole punches.

19. The combination with the pattern-punches and means for operating them, of a peg-hole punch and lacing-hole punches longer than the pattern-punches, means for operating them and means for locking and releasing the pattern, peg-hole and lacing-hole punches.

In testimony that I claim the foregoing as my invention I have signed my name, in presence of two witnesses, this 15th day of March, 1904.

JOHN ROYLE, Jr.

Witnesses:
Geo. Rowlee,
Le Roy Hartley.